(12) United States Patent
Weng et al.

(10) Patent No.: US 8,362,950 B2
(45) Date of Patent: *Jan. 29, 2013

(54) METHOD AND DEVICE FOR PREDICTING GNSS SATELLITE TRAJECTORY EXTENSION DATA IN MOBILE APPARATUS

(75) Inventors: Chin-tang Weng, Kaohsiung (TW); Yeou-jyh Tsai, Hsin-Chu (TW); Ching-Lung Fu, Yuanli Township (TW)

(73) Assignee: MEDIATEK Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/187,877

(22) Filed: Jul. 21, 2011

(65) Prior Publication Data
US 2011/0279316 A1 Nov. 17, 2011

Related U.S. Application Data

(63) Continuation of application No. 12/843,729, filed on Jul. 26, 2010, now Pat. No. 8,009,093, which is a continuation of application No. 12/103,387, filed on Apr. 15, 2008, now Pat. No. 7,786,929.

(60) Provisional application No. 61/038,585, filed on Mar. 25, 2008, provisional application No. 60/990,229, filed on Nov. 26, 2007.

(51) Int. Cl.
*G01S 19/27* (2010.01)

(52) U.S. Cl. .................................. 342/357.66

(58) Field of Classification Search ............. 342/357.21, 342/357.4, 357.46, 357.66; 701/531
See application file for complete search history.

(56) References Cited

U.S. PATENT DOCUMENTS

| | | | |
|---|---|---|---|
| 5,909,381 | A | 6/1999 | Shome et al. |
| 6,138,074 | A | 10/2000 | Gower et al. |
| 6,411,892 | B1 | 6/2002 | van Diggelen |
| 6,542,820 | B2 | 4/2003 | LaMance et al. |
| 6,560,534 | B2 | 5/2003 | Abraham et al. |
| 6,587,789 | B2 | 7/2003 | van Diggelen |
| 6,703,972 | B2 | 3/2004 | van Diggelen |
| 6,704,651 | B2 | 3/2004 | van Diggelen |
| 6,813,560 | B2 | 11/2004 | van Diggelen et al. |
| 6,845,124 | B2 | 1/2005 | Mattos et al. |
| 6,992,617 | B2 | 1/2006 | Diggelen et al. |
| 7,158,080 | B2 | 1/2007 | van Diggelen |
| 7,403,154 | B2 | 7/2008 | Garin et al. |
| 7,403,558 | B2 | 7/2008 | Mattos et al. |

(Continued)

FOREIGN PATENT DOCUMENTS

| | | |
|---|---|---|
| CN | 101446628 | 6/2009 |
| EP | 1783509 A1 | 5/2007 |

(Continued)

OTHER PUBLICATIONS

Jager, R and S. Kalber, The New RTCM 3.1 Transformation Messages-Declaration, Generation from Reference Transformations and Implementation as a sever-Client-Concept for GNSS Services, 3rd International Conference and 3rd Trade Fair of Geodesy, Cartography, Navigation and Geoinformatics. Prague, Feb. 27-28, 2008.

(Continued)

*Primary Examiner* — Dao Phan
(74) *Attorney, Agent, or Firm* — Kirton McConkie; Evan R. Witt (57) ABSTRACT

A method and device for predicting satellite trajectory extension data in a mobile apparatus. The device in accordance with the present invention comprises an I/O interface and a microprocessor. The input/output (I/O) interface is used for obtaining at least one satellite navigation message for at least one satellite. The microprocessor is used for determining a satellite trajectory prediction model according to the satellite navigation message, and propagating at least one set of satellite trajectory extension data by using the satellite trajectory prediction model.

20 Claims, 8 Drawing Sheets

U.S. PATENT DOCUMENTS

| | | | |
|---|---|---|---|
| 7,406,113 B2 | 7/2008 | Mattos et al. | |
| 7,436,357 B2 | 10/2008 | Wang et al. | |
| 7,548,200 B2 | 6/2009 | Garin | |
| 7,564,406 B2 | 7/2009 | Han | |
| 7,595,752 B2 | 9/2009 | van Diggelen et al. | |
| 7,786,929 B2 | 8/2010 | Weng et al. | |
| 8,009,093 B2 * | 8/2011 | Weng et al. | 342/357.66 |
| 8,120,530 B2 * | 2/2012 | Weng | 342/357.66 |
| 2002/0190898 A1 | 12/2002 | Abraham et al. | |
| 2006/0055598 A1 | 3/2006 | Garin et al. | |
| 2007/0008053 A1 | 1/2007 | Mochizuki et al. | |
| 2007/0200752 A1 | 8/2007 | van Diggelen et al. | |
| 2007/0247354 A1 | 10/2007 | Garin | |
| 2007/0260399 A1 | 11/2007 | Abraham et al. | |
| 2007/0299609 A1 | 12/2007 | Garin et al. | |
| 2008/0186228 A1 | 8/2008 | Garin et al. | |
| 2008/0270026 A1 | 10/2008 | Han | |
| 2009/0009389 A1 | 1/2009 | Mattos | |
| 2009/0219206 A1 | 9/2009 | Garin | |
| 2009/0231192 A1 | 9/2009 | van Diggelen et al. | |

FOREIGN PATENT DOCUMENTS

| | | |
|---|---|---|
| EP | 1852711 A1 | 11/2007 |
| EP | 1873546 A1 | 1/2008 |
| JP | 2004-529032 | 9/2004 |
| JP | 2007-292763 | 11/2007 |
| JP | 2008-3092 | 1/2008 |
| JP | 2008-191158 | 8/2008 |
| JP | 2008-538234 | 10/2008 |
| TW | 200718964 | 5/2007 |
| WO | 20081055223 | 5/2008 |
| WO | 20081066639 | 6/2008 |

OTHER PUBLICATIONS

Beutler, G. et al.; "GPS for Geodesy"; Peter J. G. Teunissen (ed.) and Alfred Kleusberg (ed.), Oct. 16, 1998.

Wang Mengli, Chen Huaming, Wang Feixue; Effective Age of GPS Almanac Data; Journal of Telemetry, Tracking, and Command; May 2007; p. 31-35; vol. 28 No. 3; China.

* cited by examiner

METHOD AND DEVICE FOR PREDICTING GNSS SATELLITE TRAJECTORY EXTENSION DATA IN MOBILE APPARATUS

CROSS REFERENCE TO RELATED APPLICATION

The present application is a Continuation Application of U.S. patent application Ser. No. 12/843,729, filed on Jul. 26, 2010, which is a Continuation Application of U.S. patent application Ser. No. 12/103,387, filed on Apr. 15, 2008, now, U.S. Pat. No. 7,786,929, and claimed the benefit of the filing date under 35 U.S.C. §119(e) of a Provisional U.S. Patent Application No. 60/990,229, filed on Nov. 26, 2007, and a Provisional U.S. Patent Application No. 61/038,585, filed on Mar. 25, 2008, which are all incorporated by reference herein.

TECHNICAL FIELD OF THE INVENTION

The present application relates to GNSS (Global Navigation Satellite System) trajectory prediction.

BACKGROUND OF THE INVENTION

For a GNSS (e.g. GPS) receiver, sensitivity is a major performance criterion. TTFF (Time to First Fix) is a representative standard for receiver sensitivity. To speed up TTFF, a technique called AGPS (Assisted Global Positioning System) is developed to promote TTFF performance. In an AGPS system, an assistant information is provided to a remote receiver so that the receiver can fix positions of satellites in a shortened period of time. An important portion of the assistant information is satellite navigation message, such as ephemeris, or satellite trajectory prediction data. The orbit determination technology and satellite trajectory prediction can be implemented by using a plenty of ranging observations from reference ground network stations, which can be simply referred to as ground observations. Practically, the processing of ground observations is complicated, thus strong calculation capability is required to execute the processing. As it is known, there must be some prediction errors existing in satellite trajectory extension, i.e. satellite trajectory predication, due to imperfect satellite trajectory prediction models. Therefore, prediction of the satellite trajectory cannot be extended unlimitedly. Currently, it is possible to predict the satellite trajectory for the up-coming 7 to 14 days.

For the reason mentioned above, only a device with high calculation capability such as a server is sufficient to support the satellite trajectory prediction. The server calculates the predicted satellite trajectory and passes the calculated satellite trajectory or equivalent data set to an AGPS server. Then the AGPS server provides the satellite trajectory prediction or equivalent data set to users through connection. According to the conventional schemes, it is difficult to execute the satellite trajectory prediction on a mobile apparatus such as a PDA (Personal Digital Assistant), a smart phone or the like. Therefore, it is an object of the present invention to provide a method and a device for generating GNSS satellite trajectory prediction that can be implemented and resided on a host processor, which can be embedded in a mobile apparatus.

SUMMARY OF THE INVENTION

In accordance with an aspect of the present invention, a method for predicting GNSS satellite trajectory in a mobile apparatus comprises steps of obtaining at least one satellite navigation message for at least one satellite; determining a propagating condition according to the obtained satellite navigation message; estimating at least one parameter of a satellite trajectory prediction model according to the propagating condition; and propagating at least one set of satellite trajectory extension data by using the estimated satellite trajectory prediction model. The satellite navigation message can be obtained from satellite broadcasting or from an external source such as a server.

In accordance with another aspect of the present invention, a device for predicting GNSS satellite trajectory in a mobile apparatus comprises an interface for obtaining at least one satellite navigation message for at least one satellite; and a microprocessor for determining a propagating condition according to the satellite navigation message, estimating at least one parameter of a satellite trajectory prediction model according to the propagating condition, and propagating at least one set of satellite trajectory extension data by the estimated satellite trajectory prediction model. The mobile apparatus may also comprise a receiver for receiving the satellite navigation message.

The satellite trajectory predication model used in the present invention can be any proper model such as a compact force model or an adjusted orbit model. The satellite navigation message comprises broadcasting ephemeris and/or almanac as well as satellite position state vector information and/or satellite velocity vector state information.

DETAILED DESCRIPTION OF THE INVENTION

Figure 1:
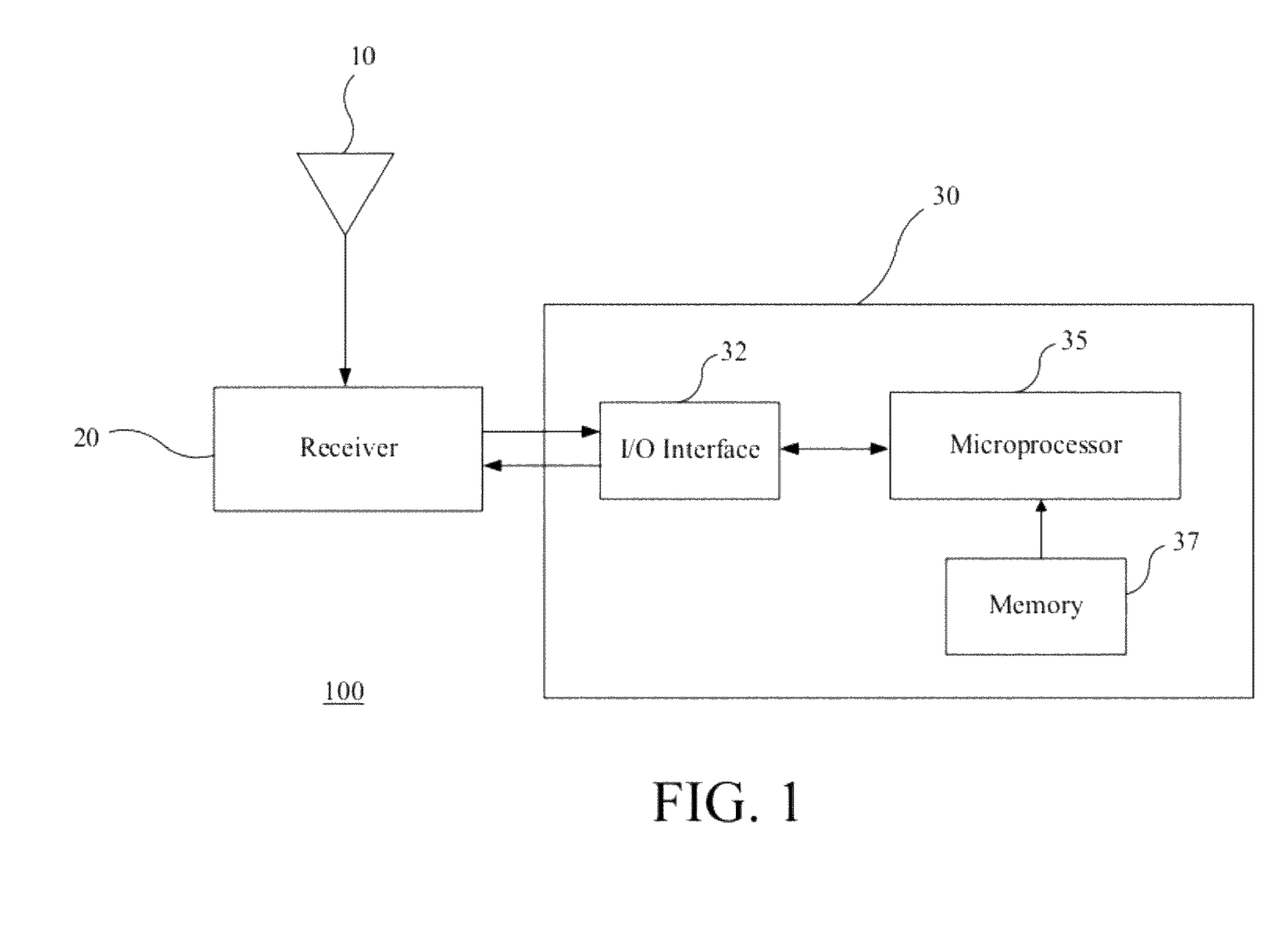
FIG. 1 is a schematic illustration showing a mobile apparatus having a device for predicting trajectory extension data in accordance with the present invention.

FIG. 1. is a schematic illustration showing a mobile apparatus 100 in accordance with the present invention. The mobile apparatus 100 includes an antenna or antenna set 10 for receiving GNSS satellite signals and a GNSS receiver 20 as widely known in this field. The mobile apparatus further includes a host device 30, which can be a host part of a PDA, a mobile phone, a portable multimedia player, a GPS device or the like. The host device 30 has an I/O interface 32, an embedded microprocessor 35, and a memory 37.

Figure 2:
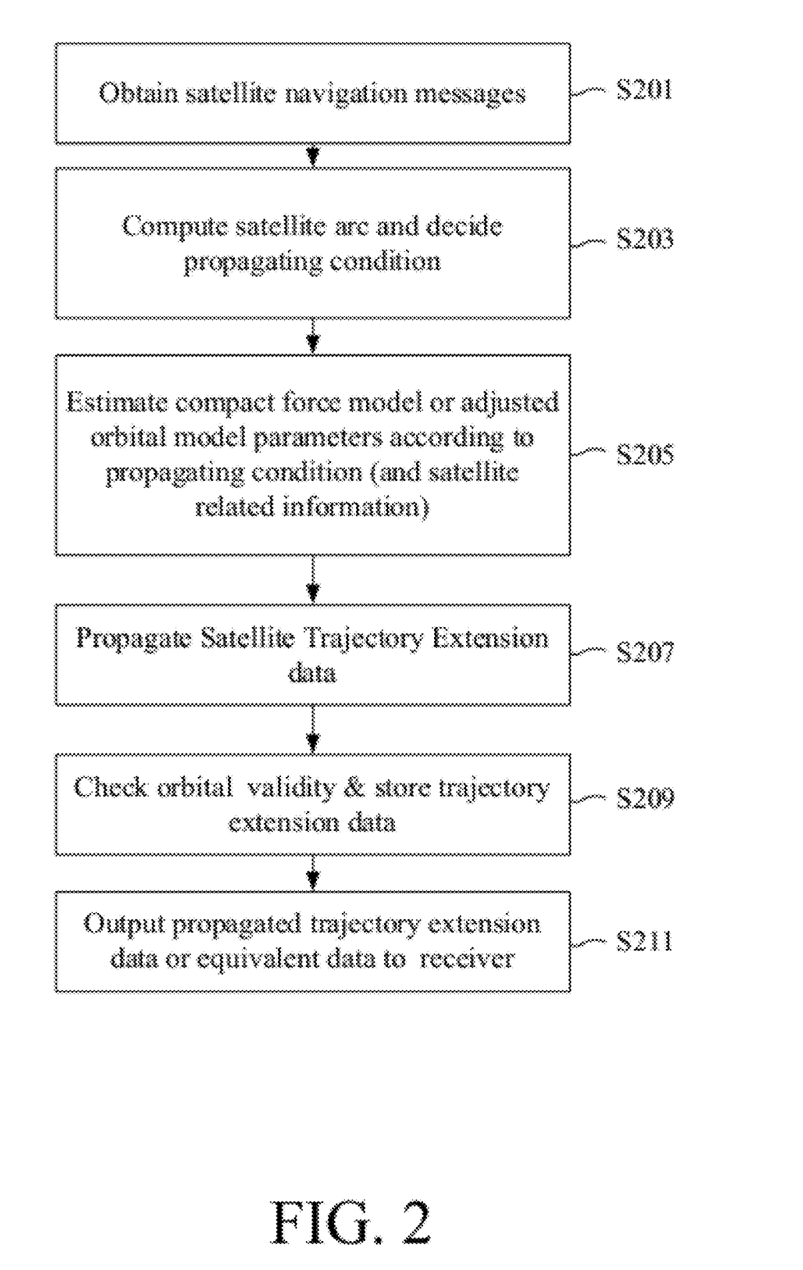
FIG. 2 is a flow chart showing a method for predicting trajectory extension data in accordance with the present invention.

Also refer to FIG. 2, which is a flow chart showing a method for predicting satellite trajectory extension data in accordance with the present invention. The GNSS receiver 20 collects broadcasting GNSS satellite navigation messages such as broadcasting ephemeris and/or almanac information as well as satellite position state vectors and/or satellite velocity sate vectors via the antenna 10 in step S201. The receiver 20 transmits the satellite navigation messages to the host device 30. The receiver 20 may just pass the satellite navigation messages to the host device 30, and the microprocessor 35 embedded in the host device 30 decodes the satellite navigation messages. Alternatively, the receiver 20 decodes the satellite navigation messages and passes the decoded messages to the host device 30 directly. Then, the obtained and decoded satellite navigation messages are stored in the memory 37. Other satellite related information such as satellite geometric information, earth orientation information, coordinates transformation information, the earth potential model information (e.g. JGM3, EGM96 . . . etc.), the solar system ephemerides (e.g. JPL DE200 or DE405) and tidal models are all pre-stored in the memory 37 of the host device 30.

Figure 3:
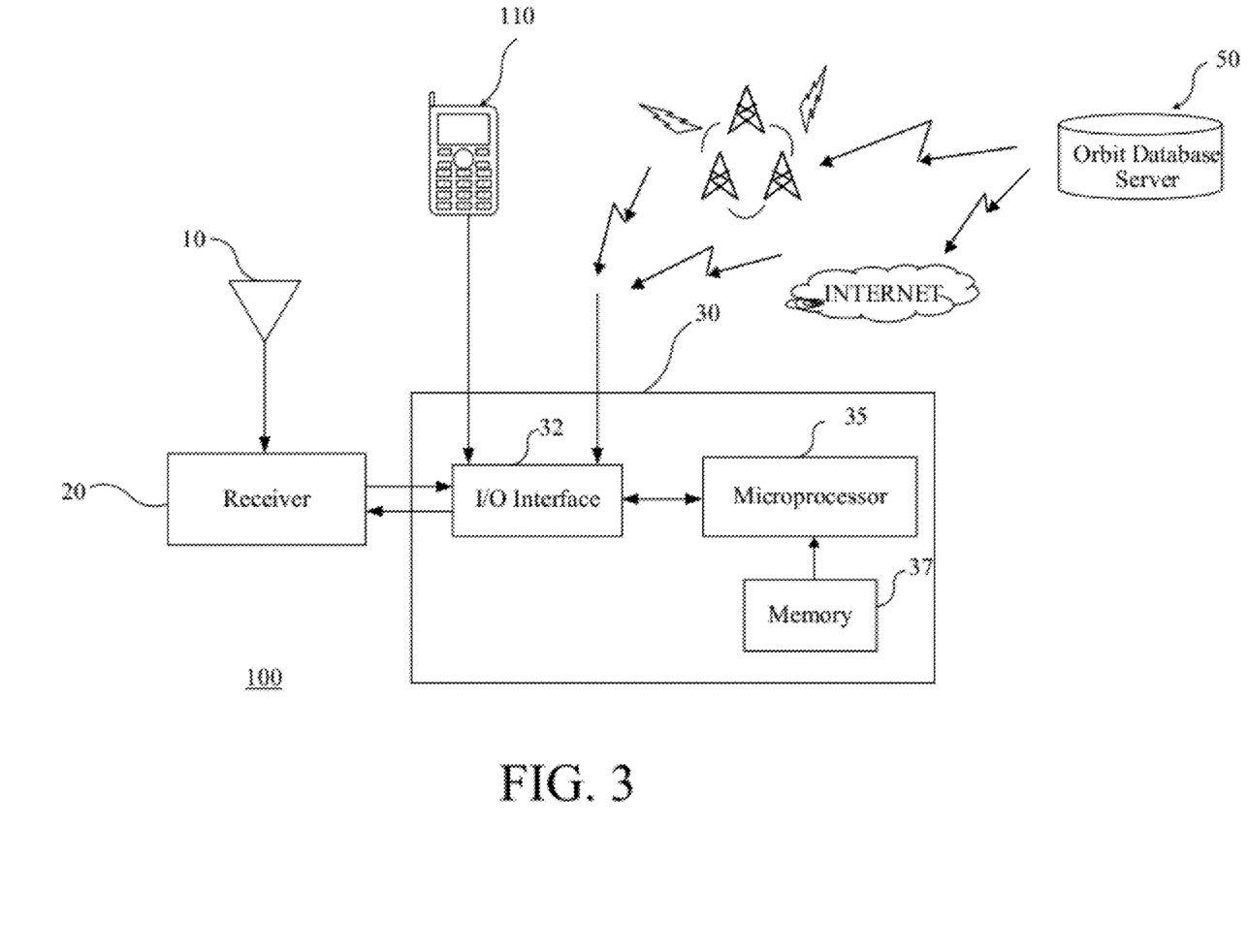
FIG. 3 is a schematic illustration showing various satellite navigation message sources for the mobile apparatus having the device for predicting satellite trajectory extension data in accordance with the present invention.

FIG. 3 is a schematic illustration showing various satellite navigation message sources for the mobile apparatus 100. As shown, the mobile apparatus 100 also externally obtains satellite navigation messages. In addition to broadcast ephemeris and almanac received through the antenna 10, the host device 30 obtains information for predicting satellite trajectory extension data from an external source such as an orbit database server 50 or another mobile apparatus 110 via network or wireless communication. It is noted that the host device 30 of the mobile apparatus 100 can also predict satellite trajectory extension data based on history information saved therein. The microprocessor 35 can also check consistency between the satellite navigation messages from different sources (e.g. broadcasting ephemeris received via the antenna 10 and information from another mobile apparatus 110) before executing satellite trajectory extension data prediction.

Figure 4:
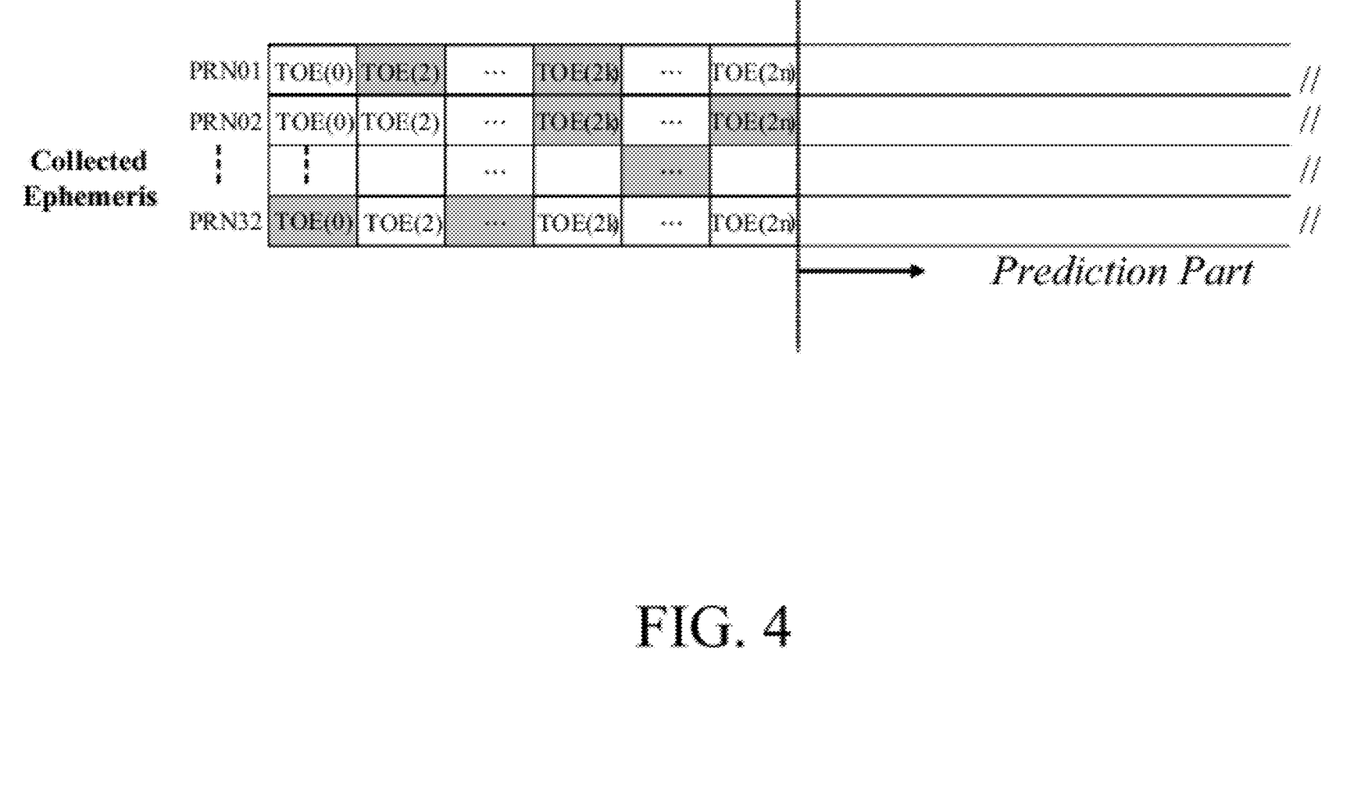
FIG. 4 schematically shows satellite navigation message segments obtained by the host device of FIG. 1.
Figure 5:
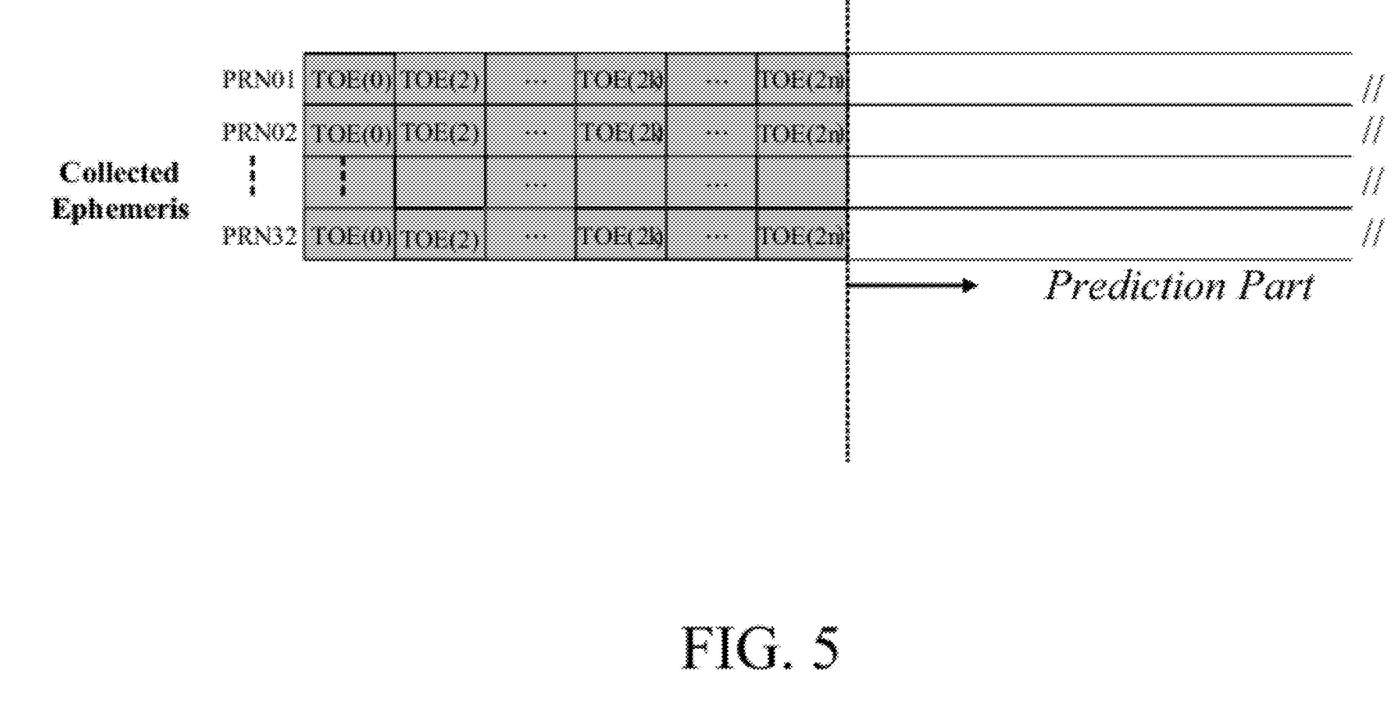
FIG. 5 is a schematic diagram showing all satellite message segments of TOE(2) to TOE(2n) collected by the host device of FIG. 3.

FIG. 4 shows schematically satellite navigation message segments obtained by the host device 30 of FIG. 1. In this drawing, the shadowed checks indicate that the satellite navigation message segments of the corresponding time intervals are obtained. FIG. 4 shows the broadcast ephemeris being received by the device 30. For example, as shown, for a satellite PRN01, the ephemeris segments of TOE(2) (i.e. ephemeris of time $t_2$ to $t_4$) and TOE(2k) (i.e. ephemeris of time $t_{2k}$ to $t_{2k+2}$) are obtained. That is, satellite messages of two discrete time intervals are known. For another satellite PRN02, the ephemeris segments of TOE(2k) and TOE(2n) are obtained. As generally known, orbit accuracy of ephemeris is better than an almanac. Accordingly, only the almanac in the vicinity of time of almanac (TOA) can be used. The microprocessor 35 then can use the known satellite navigation messages to predict the extended portion of satellite trajectory. Generally, multiple discrete ephemeris segments provide more complete data set of satellite navigation messages. However, even if only one ephemeris segment is obtained, it is also possible to predict the extended trajectory. In contrast, if all ephemeris segments and/or almanac segments are known, satellite trajectory prediction can be done for a very long period with high accuracy. FIG. 5 is a diagram schematically showing that all satellite message segments of TOE(2) to TOE(2n) are collected by the host device 30 of the FIG. 3. It is difficult to collect all satellite message segments of TOE(2) to TOE(2n) by host device 30 shown in FIG. 1. However, through the help from the additional source such as another mobile apparatus 110 or the orbit database server 50, the host device 30 as shown in FIG. 3 can collect all satellite message segments easily.

Referring to FIG. 2, the microprocessor 35 computes the satellite arcs one by one according to the satellite navigation messages in step S203. A satellite arc means a segment of the satellite trajectory within a time interval corresponding to one segment of ephemeris or almanac. As known, ephemeris is updated every two hours. If the receiver 20 is turned on at any time between time of ephemeris $t_{2k}$ to $t_{2k+2}$, once the receiver 20 "hits" the satellite (i.e. the satellite is acquired), then the ephemeris during this period TOE(2k) is obtained. That is, if ephemeris of time interval TOE(2k) is received, then the satellite arc during $t_{2k}$ to $t_{2k+2}$ is obtained.

Figure 6:
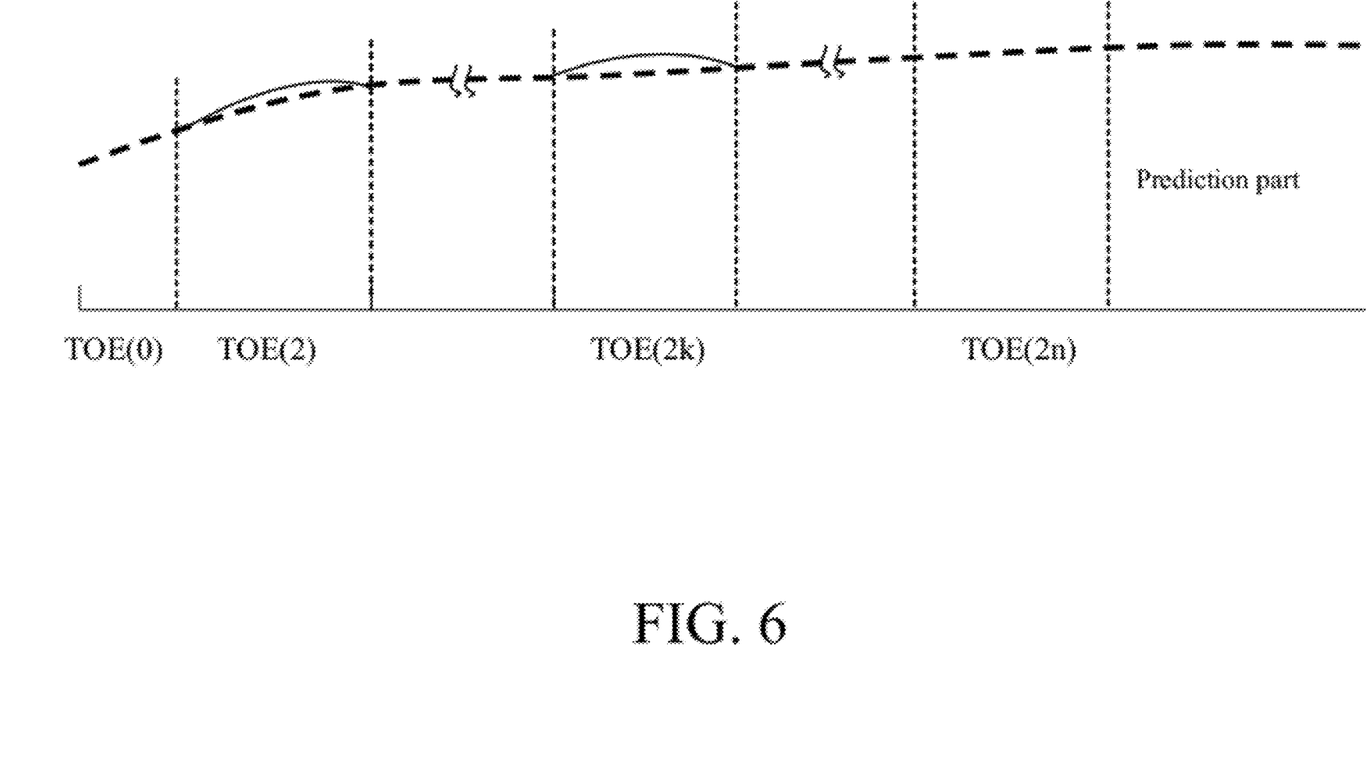
FIG. 6 is a schematic diagram showing satellite arc information obtained from satellite navigation messages such as the obtained broadcasting ephemeris of satellite PRN01 in FIG. 4.

FIG. 6 is a schematic diagram showing satellite arc information obtained from satellite navigation messages such as obtained broadcasting ephemeris of satellite PRN01 as shown in FIG. 4. Each of the solid curves indicates that the ephemeris and/or almanac during the corresponding intervals are obtained. This is called a satellite arc. The dashed curve indicates the approximated satellite trajectory. As shown, satellite arc information during intervals TOE(2) (i.e. $t_2$ to $t_4$) and TOE(2k) (i.e. $t_{2k}$ to $t_{2k+2}$) are known. Then, many schemes can be used to approach a set of trajectory extension data. For example, the satellite arcs of TOE(2) and TOE(2k) can be combined to simulate the corresponding portion of the dashed curve. A satellite arc between TOE(2) and TOE(2k) can be ignored here, or, if necessary, it can be extracted by an interpolation scheme. Then, by using the information, the extended satellite arc after TOE(2k) can be predicted.

The satellite arc can be presented as PVT type (position, velocity, and time) or Keplerian element type. In orbit determination, an example taking elliptic orbits, which may be characterized by orbital elements including six Keplerian orbital elements, will be described as an example. The six Keplerian orbital elements are semi-major axis element "a" defining the size of the orbit; eccentricity element "e" defining the shape of the orbit; inclination element "i" defining the orientation of the orbit with respect to the earth equator; argument of perigee element "ω" defining where the low point, perigee, of the orbit is with respect to earth surface; right ascension of ascending node element "Ω" defining the location of the ascending and descending orbit locations with the earth's equatorial plane; and true/mean anomaly element "ν" defining where the satellite is with the orbit with respect to the perigee. Computing the Keplerian orbital elements from the position and velocity vectors can be done because there is a one-to-one correspondence between the position/velocity vectors and the Keplerian orbital elements. The present invention can use the satellite position and velocity at the epoch time or the six Keplerian orbital elements at the same epoch time for propagating the satellite trajectory extension data.

Referring to FIG. 2 again, in step S203, the microprocessor 35 also determines a propagating condition of a satellite trajectory prediction model. Two kinds of satellite trajectory prediction models will be described as embodiments of the present invention. It is noted that the embodiments should not be taken as a limitation of the claim scope of the present invention. The first kind of satellite trajectory prediction model is called a compact force model, and the second kind is called an adjusted orbit model.

Equation of motion for describing a general orbit model of an artificial Earth satellite can be written as:

$$\ddot{\vec{r}} = -GM\frac{\vec{r}}{r^3} + \vec{a}, \qquad (1)$$

where the first term represents the central gravity term and $\vec{a}$ is the total perturbing acceleration. GM is the product of the constant of gravity and the mass of the Earth, $\vec{r}$ F is position vector of the geocentric radius of the satellite. This second order differential equation system, in general, cannot be solved analytically, because the function of solution may be very complicated. Therefore, a compact perturbed force model or an adjusted orbit model with propagation algorithms have to be used. Equations for both the compact force model and the adjusted orbit model are derived from the equation (1).

The compact force model or adjusted orbit model has to be estimated for each subinterval arc and for each satellite individually. Thus, steps S205 and S207 are executed by a sequential scheme. In step S205, the microprocessor 35 uses the propagating condition and satellite related information to estimate a plurality of parameters of satellite trajectory prediction model. In compact force model, the model can be parameterized by the components of perturbation forces. However, in the adjusted orbit model, orbital parameters stand for a series of unknown parameters which define the orbital equation of motion. Both situations will be described later in detail. The satellite related information such as satellite geometric information, coordinate transformation information, weight and volume of the satellite stored in a memory 37, can be also used to optimize the parameters.

In step S207, the microprocessor 35 uses a propagator (not shown), which can be implemented by a program built in the microprocessor 35, to propagate a set of satellite trajectory extension data by using the propagating condition and the parameters of compact force model or the adjusted orbit model. In practice, the set of satellite trajectory extension data include data of a plurality of time periods. Each time period has a time length of at least one hour.

In step S209, the microprocessor 35 checks the validity of the propagated satellite trajectory extension data. If the propagated satellite trajectory extension data are valid, the microprocessor 35 sends the propagated satellite trajectory extension data to the receiver 20 for acquiring or tracking the satellite next time in step S211. The satellite trajectory extension data may be converted to equivalent data and stored first, and then the satellite trajectory extension data or the equivalent data are sent to the receiver 20 at subsequent start-ups. Another advantage relates to the elimination of any error due to the trajectory data being aged when relay to the satellite. Such error can cause the deviation and difference of the extension data and true orbit. This validity check avoids aging of trajectory extension data and limiting the growth of any error.

Figure 7:
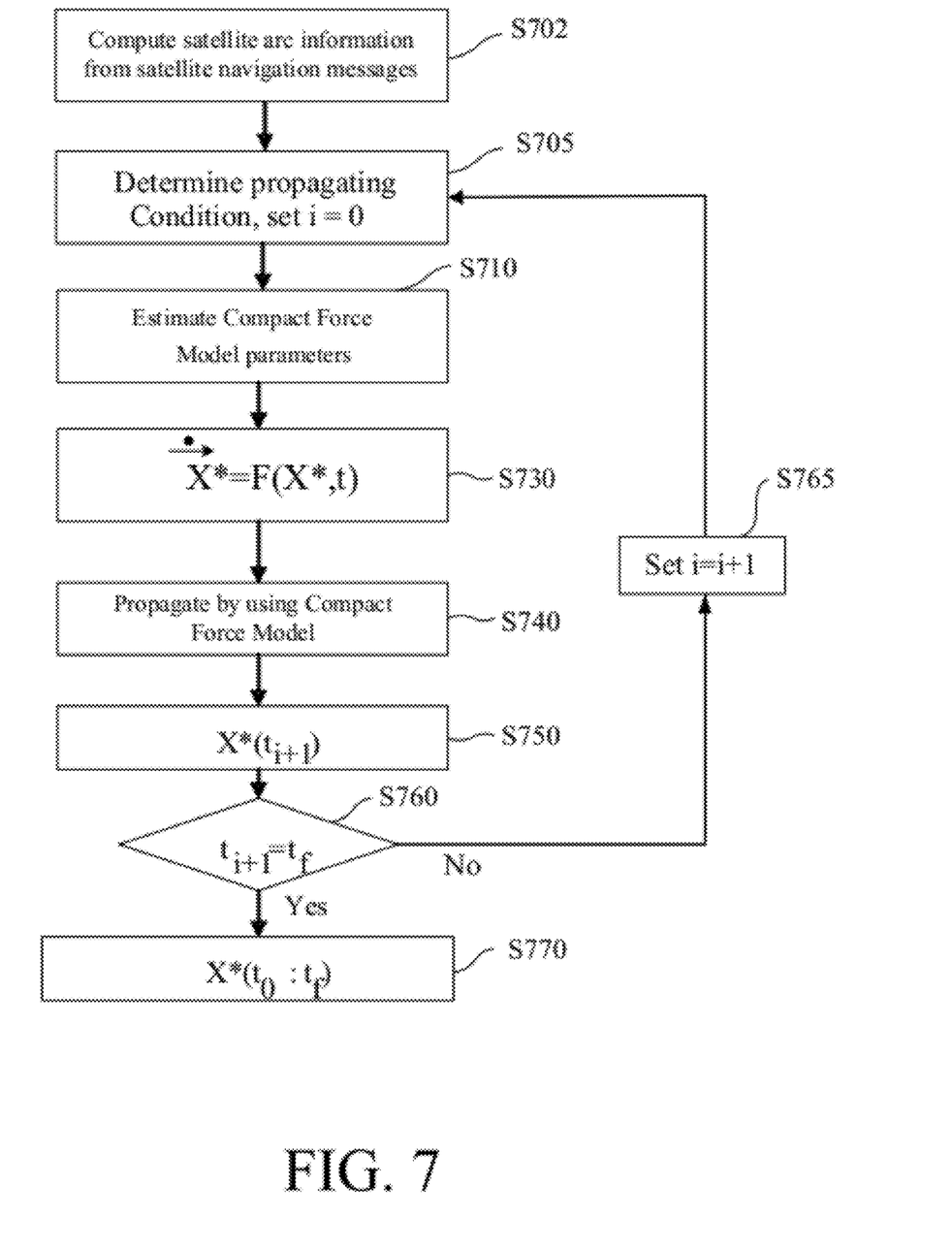
FIG. 7 is a flow chart showing a compact force model scheme for propagating a set of trajectory extension data.

FIG. 7 is a flow chart showing a compact force model scheme for propagating a set of trajectory extension data. In an embodiment of the present invention, a closer look at the perturbation term $\vec{a}$ in the equation (1) is made and the compact force model is used to summarize the various accelerations acting on the GNSS satellite. The compact force model approximates the forces influencing trajectory of a satellite so as to propagate the satellite trajectory. The forces includes earth gravity force component $F_{Gravity}$, n-body force component $F_{N-body}$, solar radiation pressure component $F_{Srad}$, earth radiation pressure component $F_{Erad}$, ocean tide attraction component $F_{Ocen\_tide}$, solid tide attraction component $F_{Sold\_tide}$ and relative gravity component $F_{relat}$. In the compact force model, equation (1) is varied as:

$$\ddot{r} = -GM\frac{\vec{r}}{r^3} + \vec{a}_{N-bod} + \vec{a}_{Srad} + \vec{a}_{Erad} + \vec{a}_{Ocean\_tide} + \vec{a}_{Sold\_tide} + \vec{a}_{relat} + \ldots \quad (2)$$

These force components are indicated by acceleration components in equation (2). For more precise numerical approximation, the entire propagating interval $[t_0, t_f]$ is divided into subintervals of a user-specified length. First in step S702, at least one satellite arc is computed from the obtained satellite navigation messages. Then, a propagating condition is determined according to the known satellite arc in step S705. That is, a satellite position is selected. In the first subinterval, the propagating condition is derived from one of the satellite positions selected from the computed satellite arcs, which are determined in step S203 or S702. In any one of the subsequent intervals, the propagating condition is derived from the approximated solution of the previous subinterval. In another embodiment of the present invention, the microprocessor 35 can just only compute one satellite position from the collected satellite navigation messages as the propagating condition, instead of computing the entire satellite arc corresponding to the satellite navigation messages.

The force components corresponding to the selected satellite position are used to estimate a plurality of parameters of compact force model $F(X^*, t_i)$ in step S710, where the $X^*$ can be substituted by the six Keplerian elements, for example, at the reference epoch $t_k$. In addition, the parameters of compact force model, such as force components, are estimated also with consideration of satellite related information including satellite geometric information and transformation information such as earth orientation factors and coordinates transforms between the celestial and terrestrial system. Then an equation of motion $\ddot{X}^* = F(X^*, t)$ is generated in step S730. The equation of motion is propagated by a propagator (step S740) to generate a segment of satellite trajectory extension data $X^*(t_{i+1})$ in step S750. The segment of satellite trajectory extension data $X^*(t_{i+1})$ indicates the trajectory from the time $t_i$ to time $t_{i+1}$. Then the microprocessor 35 checks if the epoch $t_{i+1}$ is the final epoch $t_f$ of a predetermined period of time (step S760). If not, the microprocessor 35 sets i=i+1 in step S765. That is, the microprocessor 35 is to compute the next segment of satellite trajectory extension data. After all segments of satellite trajectory extension data during the predetermined period of epoch $t_0$ to $t_f$ are propagated, the entire extended satellite trajectory $X^*(t)$ is obtained (step S770). The displacement equation of motion $X^*(t)$ in S750 is an approximation of the satellites orbit or trajectory around the earth. Thus, the $X^*(t)$ is actually a reference trajectory. For a concern of fast computing, the reference trajectory is utilized in short-term trajectory extension. Otherwise, the reference trajectory is utilized to predict a longer and more accurate extension by adjusting the model algorithm.

The microprocessor 35 can start to compute the extended trajectory once the required information is sufficient. For example, if the receiver 20 receives the broadcast satellite navigation messages only for a while, the microprocessor 35 can compute the satellite trajectory extension data for an extended trajectory section even the receiver 20 loses connection with satellite signals later. If additional satellite information is input, the microprocessor 35 re-computes the extended trajectory. As mentioned, the microprocessor 35 may compute the satellite trajectory extension data base on old data stored therein.

Figure 8:
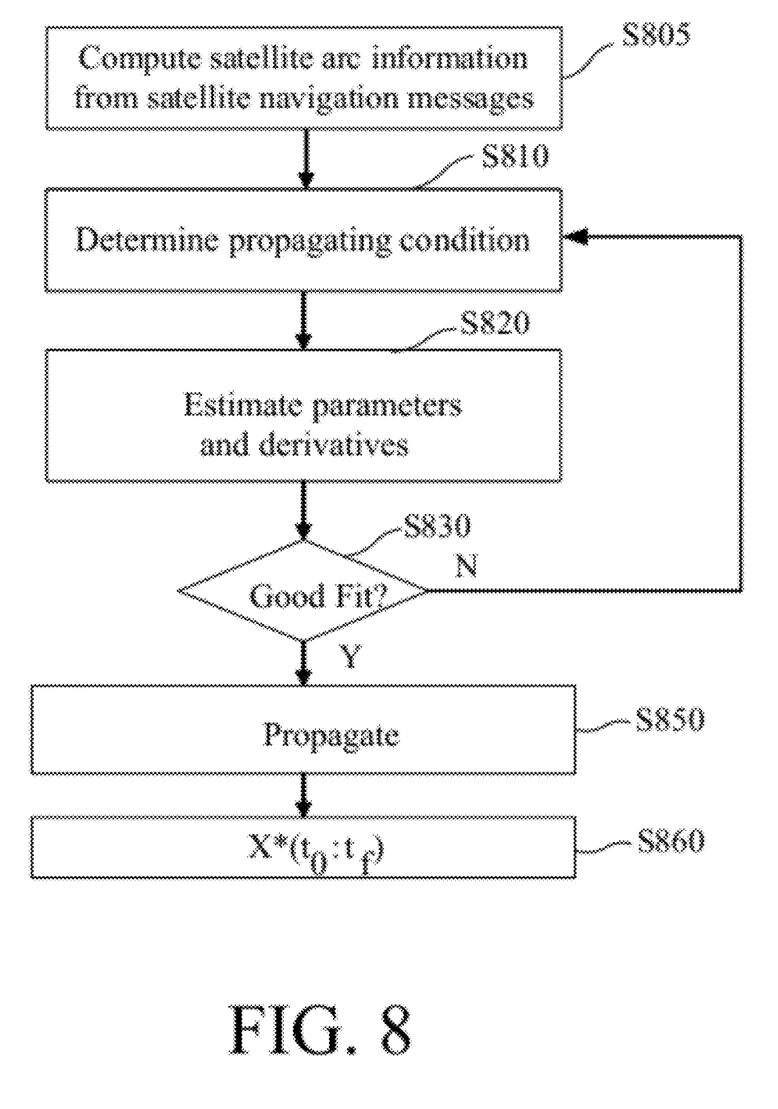
FIG. 8 is a flow chart showing an adjusted orbit model scheme for propagating a trajectory.

As mentioned, in addition to compact force model, the adjusted orbit model may also be used to predict the satellite trajectories. FIG. 8 is a flow chart showing an adjusted orbit model scheme for propagating a trajectory. An orbit in general sense is a unique (particular) solution of orbital equation of motion. The adjusted orbit model uses a series of unknown orbital parameters to define the satellite trajectory, which describes the motion of the satellite. The orbital parameters are defined as n parameters including the six Keplerian orbital elements of the orbits and additional dynamic parameters. In the adjusted orbit model, the additional dynamic parameters $q_m$ describe the additional perturbed accelerations acting on the GNSS satellite. For the adjusted orbit model, equation (1) is varied as:

$$\ddot{\vec{r}} = -GM\frac{\vec{r}}{r^3} + \vec{a}(a, e, i, \Omega, w, u, q_1, q_2, \ldots, q_m) \quad (3)$$

where the unknown parameters $\{p_i\} = \{a, e, i, \Omega, w, u, q_1, q_2, \ldots, q_m\}$ may define the particular solution of orbit $\vec{r}(t)$. The six Keplerian elements (or corresponding position and velocity state vectors) at time $t_0$ are defined from the propagating condition.

As mentioned previously, the additional parameters $q_m$ given in equation (3) are those dynamic parameters which have to be estimated for each arc and each individual satellite in order to obtain a reliable orbital fit. For example, in GNSS orbit determination, the additional dynamic parameters can be defined as the additional perturbed accelerations and/or harmonic periodic accelerations (sine and cosine terms) acting on the GNSS satellite. In advanced orbit determination, a user may wish to parameterize the orbits additionally with other stochastic parameters to improve the orbit quality.

As shown in FIG. 8, the satellite arc information is obtained from satellite navigation messages such as broadcasting ephemeris and/or almanac (step S805). The microprocessor 35 then defines the propagating condition for the orbital parameters according to the satellite arc information (step S810). In step S820, the microprocessor 35 executes orbit determination based on the propagating condition and solves the orbital parameters, which are derived from equation (3). The parameters of the satellite trajectory prediction model are estimated also with consideration of satellite related information including satellite geometric information and transformation information such as earth orientation factors and coordinates transforms between the celestial and terrestrial system. In step S830, the microprocessor 35 checks if the solved satellite arc fit the computed satellite arc from the obtained satellite navigation messages. If not, the procedure goes back to step S810 to adjust the model, that is, to adjust the parameters. The above procedure runs again. If it is determined as good fit, then the propagation of the set of trajectory extension data is executed in step S850 by the propagator (not shown). The propagation is implemented by numerical integration, for example. Then, the entire set of trajectory extension data $X^*(t_0:t_f)$ is obtained in step S860.

According to the present invention, the satellite trajectory prediction can be done in the microprocessor 35, of which the calculation capability is not so strong as a PC, in the host device 30 even when the receiver 20 coupled to or incorporated with the host device 30 is disconnected with the satellite signals.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A method for predicting GNSS satellite trajectory extension data in a mobile apparatus, said method comprising steps of:
    obtaining at least one satellite navigation message for one of satellites; determining an estimated satellite trajectory prediction model according to the obtained satellite navigation message; and
    propagating at least one set of satellite trajectory extension data by using the estimated satellite trajectory prediction model.

2. The method of claim 1, further comprising adjusting a propagating condition of the satellite trajectory prediction model to find an optimized state of the estimated satellite trajectory prediction model.

3. The method of claim 2, wherein at least one parameter of the estimated satellite trajectory prediction model is adjusted with consideration of at least one of either satellite geometric information or coordinate transformation information.

4. The method of claim 1, wherein the estimated satellite trajectory prediction model is a compact force model parameterized by perturbation force components, and the parameter relates to at least one of the perturbation force components.

5. The method of claim 4, wherein the satellite trajectory extension data set is divided into a plurality of trajectory segments and is propagated by integrating the trajectory segments one by one.

6. The method of claim 1, wherein the estimated satellite trajectory prediction model is an adjusted orbit model parameterized by orbital parameters.

7. The method of claim 6, wherein the orbital parameters include Keplerian orbital elements.

8. The method of claim 7, wherein the orbital parameters further include a plurality of dynamic parameters for describing addition perturbed accelerations acting on the satellite.

9. The method of claim 1, wherein the satellite navigation message comprises information selected from a group consisting of broadcasting ephemeris, almanac, satellite position state vectors and satellite velocity state vectors.

10. The method of claim 1, wherein the satellite navigation message is obtained from an external source other than the mobile apparatus.

11. A device for predicting GNSS satellite trajectory extension data in a mobile apparatus, said device comprising:
    an interface for obtaining at least one satellite navigation message for at least one satellite; and
    a microprocessor for determining an estimated satellite trajectory prediction model according to the satellite navigation message, and propagating at least one set of satellite trajectory extension data by using the estimated satellite trajectory prediction model.

12. The device of claim 11, wherein the microprocessor further adjusts a propagating condition of the estimated satellite trajectory prediction model to find an optimized state of the satellite trajectory prediction model.

13. The device of claim 12, wherein at least one parameter of the estimated satellite trajectory prediction model is adjusted with consideration of at least one of either satellite geometric information or coordinate transformation information.

14. The device of claim 11, wherein the estimated satellite trajectory prediction model is a compact force model parameterized by perturbation force components, and the parameter relates to at least one of the perturbation force components.

15. The device of claim 14, wherein the satellite trajectory extension data set is divided into a plurality of trajectory segments and is propagated by integrating the trajectory segments one by one.

16. The device of claim 11, wherein the estimated satellite trajectory prediction model is an adjusted orbit model parameterized by orbital parameters.

17. The device of claim 16, wherein the orbital parameters include Keplerian orbital elements.

18. The device of claim 17, wherein the orbital parameters further include a plurality of dynamic parameters for describing additional perturbed accelerations acting on the satellite.

19. The device of claim 11, wherein the satellite navigation message comprises information selected from a group consisting of broadcasting ephemeris, almanac, satellite position state vectors and satellite velocity state vectors.

20. The device of claim 11, wherein the satellite navigation message is obtained from an external source other than the mobile apparatus.

* * * * *